Figure 1:
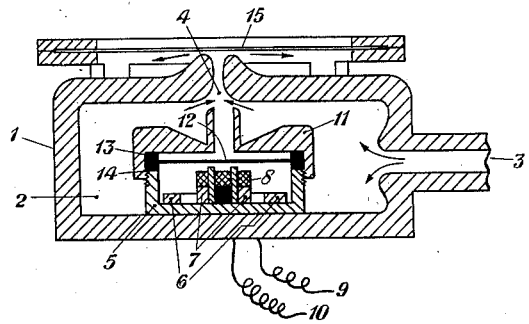

Oct. 10, 1933.    J. S. STONE    1,929,569
SOUND AMPLIFIER
Filed Sept. 1, 1927

INVENTOR.
John Stone Stone
BY
ATTORNEY

Patented Oct. 10, 1. 1,929,569

UNITED STATES PATENT OFFICE 1,929,569

SOUND AMPLIFIER

John Stone Stone, San Diego, Calif., assignor to American Telephone and Telegraph Company, a corporation of New York Application September 1, 1927. Serial No. 216,855

13 Claims. (Cl. 174—108)

This invention relates to sound amplifiers.

Amplifiers used heretofore for the amplification of signaling currents have been either electromagnetic in their action, as exemplified by the old transmitter-receiver combination of the well known substation circuit or of the electrical type, as exemplified by the audion, which superseded the old transmitter-receiver combination. The audion familiar to those skilled in the art comprises three electrodes, i. e., plate, filament, and grid electrodes, the filament and grid electrodes being connected to an input circuit and the filament and plate electrodes being connected to an output circuit.

It is an object of this invention to provide a system for the amplification of sound which does not necessarily depend upon electric or electromagnetic forces, which system may be suitable for the amplification of signaling currents.

In accordance with this invention, a jet of air or of any other suitable gaseous medium is impinged upon a smooth surface which is normal to the jet. Thus, a pressure is exerted on the smooth surface which is in the direction of the jet, and, as is well known, this pressure is proportional to the square of the velocity of the air in the jet. Means are also provided for producing variations in air pressure corresponding to signaling waves which are to be amplified. The latter variations are superimposed upon the jet of air, preferably of high velocity and of substantially constant pressure, for the purpose of modulation as well as amplification.

If $V_0$ be the normal velocity of the air in the jet and if $V_1$ be the superposed velocity of the air produced by the signaling waves to be amplified, and if these forces be directed against a diaphragm in a direction normal thereto, then the forces acting on the diaphragm at any instant will be proportional to $$(V_0+V_1)^2 \quad (1)$$

Expression (1) when expanded becomes $$V_0^2\left(1+2\frac{V_1}{V_0}+\frac{V_1^2}{V_0^2}\right) \quad (2)$$

If the velocity of the air in the jet $V_0$ be so much greater than the velocity of the superposed air $V_1$ that $V_1^2/V_0^2$ is negligible when its magnitude is compared to the magnitude of $$\frac{V_1}{V_0}$$

then the force or forces acting on the diaphragm will be substantially proportional to $$V_0^2+2V_0V_1 \quad (3)$$

The component of the force represented by expression (3), corresponding to $V_0^2$, is constant and merely produces a constant deflection or strain in the diaphragm. But the component of this force corresponding to $2V_0V_1$ represents a force which quite accurately follows the variations in the velocity of each particle of air transmitting the signaling waves to be amplified. The intensity of the latter force is proportional to the velocity of the air in the jet $V_0$ and may therefore be made as large as is deemed necessary within wide practical limits by increasing the magnitude of the velocity of the air in the jet $V_0$.

Figure 2:
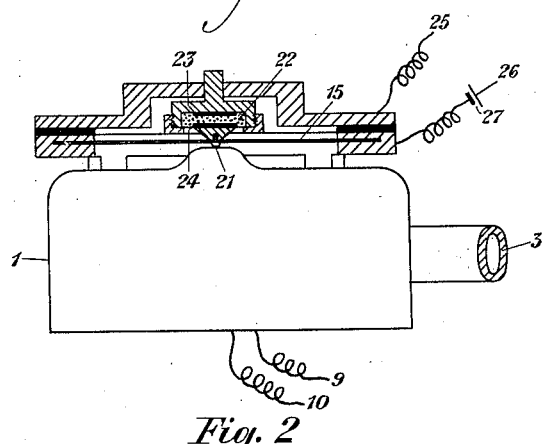
Figure 3:
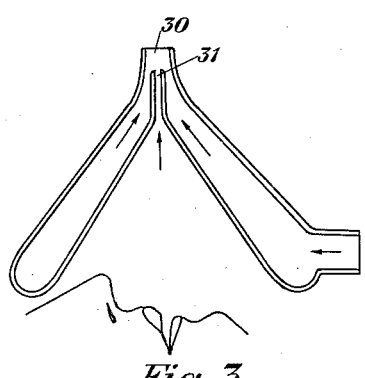

This invention will be better understood from the detailed description hereinafter following when read in connection with the accompanying drawing, in which, Fig. 1 represents in section an embodiment of the invention as applied to sound amplification; Fig. 2 represents partly in section an embodiment of the invention as applied to a telephone relay; and Fig. 3 represents in section an arrangement embodying the invention which avoids the use of diaphragms or the like.

Referring to Fig. 1 of the drawing, the reference character 1 designates a metallic member which is employed as an enclosure for a chamber 2. The metallic member 1 is equipped with a supply pipe 3 of relatively large cross-sectional area through which air or any other gaseous medium may be forced at a high pressure into chamber 2. At the top of the metallic member 1 there is an orifice or vent 4 centrally located therein. This orifice or vent is of comparatively small cross-sectional area so that if the air transmitted through the supply pipe 3 to chamber 2 is maintained at a suitable pressure, the air passing the nozzle or vent 4 will have a comparatively high velocity. Permanently fastened to the lower portion of the metallic member 1 is a casing 5 which is screw-threaded externally at the upper terminal. This casing may preferably be made of rubber, "Bakelite", or other non-conducting material. A circular magnet 6 is permanently fastened to the base of the casing 5. This magnet is preferably made of hard steel so that it may be permanently magnetized. Moreover, this magnet has two pole pieces designated by the reference character 7, and these pole pieces are preferably made of soft, permeable iron. Around these pole pieces there is a coil comprising many turns of fine wire, the terminals of which are designated by the reference characters 9 and 10. The terminals 9 and 10 of coil 8 are passed through holes in the base of the metallic chamber 1 (not shown) and these holes may thereafter be hermetically sealed.

A cylindrical member or cap 11 is provided with internal screw-threads which are engageable with the external screw-threads of the casing 5. Thus, the cylindrical member or cap 11 may be fastened to the casing 5. The cylindrical member or cap 11 is preferably made of a non-magnetic substance, such as rubber, "Bakelite", "Condensite", etc., so as to avoid, as much as possible, the introduction of eddy currents. A disk of thin sheet iron 12 becomes fastened in position when the cylindrical member 11 engages the casing 5. Thus, the edges or periphery of the disk of iron, which is better known as a diaphragm, are fixed in position so that the center of this diaphragm may be vibrated in accordance with signaling waves. Two washers 13 and 14 are placed adjacent to the edge or periphery of diaphragm 12 and tightly seal the chamber about the magnetizing winding 8 against leakage of air from the chamber 2 which is usually at a much higher pressure. Another diaphragm 15 is clamped at its edge or periphery by a ring which is supported within a skeleton frame above the metallic member 1. Diaphragm 15 need not be of a magnetic material because its action does not depend upon the presence of a magnetic field.

The orifice or vent 4 at the upper part of chamber 2 is carefully shaped so as to conform as nearly as possible to the probable stream lines of the air jet. Air passing through the nozzle or vent 4 reaches a high velocity, and, due to the curvature of the nozzle or vent, a pressure is produced against diaphragm 15 which is substantially perpendicular to it. Throughout the entire apparatus all sharp corners or edges in and about which air currents may possibly form eddys and therefore produce noises, are avoided. Stream line surfaces should be substituted for such corners or edges wherever possible to carry out the principles underlying this invention efficiently.

The diaphragm 12 is firmly supported at its edges so that it may vibrate with large amplitude at its center. Signaling waves transmitted over conductors 9 and 10 through the coil 8 produce a magnetic field of varying intensity, the intensity increasing with the increase in the strength of these signaling currents. Thus, the pressure of the air adjacent to the diaphragm 12 will vary in accordance with these signaling waves. These variations of air pressure are transmitted upwardly through the necked portion of the cylindrical member 11. These variations will then be superposed upon the normally constant air pressure of the jet at orifice 4.

The supply pipe 3 leading to chamber 2 should be made large in cross-sectional area as compared to the cross-sectional area of the nozzle or vent 4. Thus, the velocity of the air in the supply pipe will be comparatively low. Noises from an air pump, such as may be employed to force air through the supply pipe, may, however, be transmitted to chamber 2 through the air screen in the supply pipe and through the walls of this pipe, unless precautions be taken to prevent such transmission. One of the ways of preventing the transmission of such noise through the pipe walls is to bury a short length of the pipe in the earth or under water. This effectively draws the sound of the pump out of the pipe into the surrounding earth or water and dissipates it. Acoustic filters of any well known type may, if desired, be interposed between chamber 2 and the air pump in order to further minimize the possibility of noise transmission. Moreover, sections of the supply pipe may be separated by gaskets of rubber or fiber or the like in order to further diminish the conductivity of the transmission path established by the supply pipe. An effective method of blocking out pump sounds from the air stream in the supply pipe is to insert in the supply pipe an enlarged section of pipe or a chamber filled with wool, felt lint, or the like. An inserted pipe or chamber of such large section will greatly diminish the velocity of the air screen at that point in the transmission path without any great loss in the pressure head, but the dampening effect upon the sound waves will be such as to effectively block their passage to chamber 2.

Fig. 2 shows a solid-back transmitter button attached at point 21 to the center of diaphragm 15 so that the sound amplifier of Fig. 1 may be converted into an amplifying telephone relay. Here a cell 22 containing carbon granules between two plates of polished carbon 23 and 24 is mounted between the diaphragm 15 and the solid upper portion of the apparatus. On each side of cell 22 there is a metallic plate which is connected in circuit with conductors 25 and 26 and with a battery 27.

When sound waves corresponding to signaling waves fall upon the diaphragm 15 the vibrations cause a variation in the pressure on the carbon cell 22 and, consequently, a change in the resistance of this cell takes place. The resistance in the circuit of the conductors 25 and 26 and the internal resistance of cell 27 are small compared with that of the granular carbon within cell 22. Thus, the variations in the resistance of cell 22 cause considerable changes in the strength of the electric current flowing over conductors 25 and 26.

A device embodying the principles of this invention may be used as a pure sound amplifier without the intervention of the telephone receiver in chamber 2. Looking at Fig. 1, it is easy to see that a diaphragm, such as 15, may be fitted directly opposite the orifice or vent 4 so that speech may be directly impinged upon this diaphragm. Such speech will result in sound variations in the chamber 2 which will be repeated in greatly amplified form by diaphragm 15. If the diaphragm employed in accordance with this invention directly opposite the orifice or vent 4 is considered to be under too heavy a strain, due particularly to the high air pressure within chamber 2, then this strain may be relieved either by a spring acting upon its center or by an electromagnet mounted adjacent thereto, exerting a pull on the diaphragm which may be approximately equal and opposite to the thrust produced by the air pressure within chamber 2.

In the form of the apparatus disclosed in Fig. 1 of the drawing, amplified sound is developed by the upper diaphragm against which an intelligence or sound-bearing jet of air is directed. But if the jet be not directed against the diaphragm but rather against the still air outside chamber 2, the instantaneous forces acting upon the still air will also be proportional to the square of the instantaneous velocity of the air in the jet and sound waves bearing signals will be reproduced with an intensity which is proportional to its instantaneous velocity.

Both Figs. 1 and 2 of the drawing show apparatus, including one or two diaphragms, which may be employed for the transmission and amplification of sound. The quality of the sound produced by such apparatus is characteristic of the diaphragm. Fig. 3 shows another embodiment of the invention which avoids the use of the diaphragm or diaphragms and still preserves the feature of sound reproduction with an intensity approximately proportional to the velocity of an air jet $V_0$. At 30 a jet of air is produced at high velocity. This jet of air becomes modulated by the speech transmitted through an orifice 31. The modulated jet is of considerable amplitude.

While this invention has been pointed out in certain particular arrangements merely for the purpose of illustration, it is to be distinctly understood that the general principles of this invention may be applied to other and widely varied organizations without departing from the spirit of the invention or the scope of the appended claims.

What is claimed is:

1. The combination of a continuous jet of air at high velocity, a jet of air bearing intelligence, and means for combining these jets of air in order to cause the modulation of the first jet of air by the intelligence-bearing jet of air for amplification of the latter jet.

2. The combination of a diaphragm vibrated in accordance with speech signals producing corresponding air vibrations, a jet of air flowing continuously at a high velocity, and a second diaphragm against which the jet of air of high velocity as well as the air vibrations corresponding to the speech signals are directed, thereby producing air vibrations corresponding to the speech signals of high intensity.

3. The combination of a diaphragm vibrated in accordance with speech signals producing corresponding air vibrations, a jet of air flowing continuously at a high velocity, and an electromagnetic transmitter having a diaphragm against which the air jet of high velocity as well as the air vibrations corresponding to the speech signals are directed, thereby producing air vibrations corresponding to the speech signals at high intensity.

4. The combination of an electromagnetic receiver having a diaphragm vibrated in accordance with signaling waves producing corresponding air vibrations, a nozzle through which air flows continuously at high velocity, and an electromagnetic transmitter having a diaphragm against which the air jet of high velocity as well as air vibrations corresponding to the signaling waves are directed, in order to produce air vibrations modulated in accordance with the signaling waves at high intensity.

5. The combination of a diaphragm vibrated in accordance with signaling waves producing corresponding air vibrations, an orifice through which air passes continuously at a high velocity, an electromagnetic transmitter having a diaphragm against which the high velocity air jet as well as the air vibrations corresponding to the signaling waves are directed, and a pair of conducting wires connected to the electromagnetic transmitter through which the high intensity vibrations are electrically transmitted.

6. The combination of a chamber having an orifice of small cross-sectional area, means for continuously transmitting through the orifice of said chamber a jet of air at a high velocity, an electromagnetic telephone receiver hermetically sealed within said chamber, and a diaphragm actuated by the air of high velocity passing through the orifice of the chamber as well as by the air vibrated by the electromagnetic telephone receiver.

7. A sound amplifier comprising a diaphragm upon which a jet of air of high velocity may be continuously impressed, and means for producing sound variations corresponding to signaling waves which may also be impressed upon said diaphragm, whereby highly amplified sound variations corresponding to said signaling waves may be produced.

8. A sound amplifier comprising means for continuously transmitting air from an air chamber of substantially high pressure through a nozzle of small cross-sectional area so that the air may be given a high velocity, means for producing variations in air pressure corresponding to signals, and means for combining the high velocity air jet transmitted from said air chamber with the air variations corresponding to signals for modulating said high velocity air jet in accordance with said variations in the air pressure corresponding to the signals.

9. A sound amplifier comprising a gaseous medium which may be transmitted continuously through a nozzle at a high velocity, another gaseous medium at a low velocity which is modulated in accordance with signals, and means for combining these media to produce sound modulations corresponding to said signals of high intensity.

10. In a sound reproducing device employing compressed air, the combination with means for producing a magnetic field of means comprising a tube through which sound vibrations are transmitted under the influence of said means for controlling the escape of compressed air for producing sounds.

11. In a sound reproducing device employing escaping compressed air as the source of sound waves, the combination with means for producing a constant magnetic field, means for varying the constant field and means comprising a tube through which sound vibrations are transmitted and influenced by the resultant varying field for controlling the escape of compressed air to produce sounds.

12. In a sound reproducing device employing escaping compressed air as the source of sound waves, the combination with means for producing a constant magnetic field, means for varying the constant field and means comprising a tube through which sound vibrations are transmitted and influenced by the resultant varying field for modulating the escaping compressed air in accordance with the varying resultant field to produce sounds.

13. In a sound reproducing device employing compressed air for producing sound waves, the combination with means including a nozzle for valving the escape of compressed air and a tube through which sound vibrations are transmitted, of electromagnetic means for operating said valving means in accordance with telephonic currents supplied thereto for producing sounds from the escaping compressed air.

JOHN STONE STONE.